(12) United States Patent
Kunugi et al.

(10) Patent No.: US 7,004,137 B2
(45) Date of Patent: Feb. 28, 2006

(54) V-TYPE MULTIPLE-CYLINDER AIR INTAKE DEVICE

(75) Inventors: Takashi Kunugi, Kamakura (JP); Shigeru Sakuragi, Katsushika-ku (JP); Toru Sasaki, Yokosuka (JP); Hidehiro Fujita, Yokohama (JP)

(73) Assignee: Nissan Motors Co., LTD, Kanagawa (JP)

( * ) Notice: Subject to any disclaimer, the term of this patent is extended or adjusted under 35 U.S.C. 154(b) by 0 days.

(21) Appl. No.: 10/987,032

(22) Filed: Nov. 15, 2004

(65) Prior Publication Data

US 2005/0126531 A1    Jun. 16, 2005

(30) Foreign Application Priority Data

Dec. 10, 2003 (JP) ............................. 2003-411318

(51) Int. Cl.
*F02M 35/10* (2006.01)
(52) U.S. Cl. ............................. 123/184.35; 123/184.53
(58) Field of Classification Search ........... 123/184.35, 123/184.36, 184.53, 184.55, 184.56, 184.59
See application file for complete search history.

(56) References Cited

U.S. PATENT DOCUMENTS

| | | | | |
|---|---|---|---|---|
| 4,809,647 A | * | 3/1989 | Masumoto et al. .... | 123/184.36 |
| 4,829,941 A | * | 5/1989 | Hitomi et al. ......... | 123/184.31 |
| 4,919,087 A | * | 4/1990 | Ogami et al. ............... | 123/54.6 |
| 4,945,865 A | * | 8/1990 | Lee ......................... | 123/184.43 |
| 4,977,865 A | * | 12/1990 | Hiraoka et al. ........ | 123/184.36 |
| 5,048,471 A | * | 9/1991 | Takii et al. ............. | 123/184.36 |
| 5,544,629 A | * | 8/1996 | Ohata et al. ........... | 123/184.36 |
| 5,715,781 A | * | 2/1998 | Martinelli ............... | 123/184.36 |
| 5,839,404 A | * | 11/1998 | Numata et al. ........ | 123/184.34 |
| 5,890,464 A | * | 4/1999 | Martinelli ............... | 123/184.36 |
| 6,718,930 B1 | * | 4/2004 | Ozeki ..................... | 123/184.55 |
| 6,725,822 B1 | * | 4/2004 | Matsumoto et al. ... | 123/184.34 |
| 2003/0015161 A1 | * | 1/2003 | Ozeki .................... | 123/184.55 |

FOREIGN PATENT DOCUMENTS

| JP | 06280576 A | * 10/1994 |
|---|---|---|
| JP | 11-294171 | 10/1999 |

* cited by examiner

*Primary Examiner*—John T. Kwon
(74) *Attorney, Agent, or Firm*—Shinjyu Global IP Counselors, LLP

(57) ABSTRACT

A V-type multiple cylinder air intake is being configured to improve the volumetric efficiency by utilizing the resonance effect while also eliminating the adverse influence of the resonance effect (residual resonance) when the engine is operating in regions of medium to high rotational speeds. The V-type multiple-cylinder air intake device has two collectors with one arranged on each bank of the V-type multiple-cylinder engine; a plurality of branch pipes extending from the collectors to a respective intake port of an opposite bank; and a plurality of crossover passages extending from the collectors to a respective branch pipes extending from the collector of the opposite bank.

17 Claims, 9 Drawing Sheets

V-TYPE MULTIPLE-CYLINDER AIR INTAKE DEVICE

BACKGROUND OF THE INVENTION

1. Field of the Invention

The present invention generally relates to a V-type multiple-cylinder air intake device.

2. Background Information

One example of a V-type multiple-cylinder air intake device is disclosed in Japanese Laid-Open Patent Publication No. 11-294171. The air intake device described in that publication is provided with a collector having a first volume chamber in a middle section thereof, a pair of second volume chambers arranged on both sides of the first volume chamber, and ON/OFF valves configured and arranged to connect and disconnect the second volume chambers to and from the first volume chamber. When the engine is operating in a low rotational speed region, the ON/OFF valves are closed so as to separate the left and right second volume chambers into independent chambers. As a result, the volumetric efficiency is improved by a resonance effect. When the engine is operating in a high rotational speed region, the ON/OFF valves are opened and the first and second volume chambers are integrated into a single chamber having a larger volume. As a result, the volumetric efficiency is improved by an inertia effect.

In view of the above, it will be apparent to those skilled in the art from this disclosure that there exists a need for an improved V-type multiple-cylinder air intake device. This invention addresses this need in the art as well as other needs, which will become apparent to those skilled in the art from this disclosure.

SUMMARY OF THE INVENTION

It has been discovered that there are times, when it is necessary to reduce the volume of the collectors due to layout constraints. Thus, separate and independent collectors are provided for the left and right banks, respectively. With separate left and right collectors, the number of cylinders to which each collector is connected is cut in half. Similar to the prior art described above, a resonance effect can be obtained with the collectors having such an arrangement. However, when the engine is operating in medium to high rotational speed regions, this resonance becomes counter-effective residual resonance and causes the output of the engine to decline. Consequently, it is necessary to eliminate the residual resonance.

One feasible method of eliminating the residual resonance of the left and right separated collectors is to connect the left and right collectors with a communication pipe. However, this method cannot always be utilized in a straightforward manner because it is necessary to provide the communication pipe with a comparatively large cross sectional area. If the collector volume has been reduced due to layout constraints, the large cross sectional area of the communication pipe will be counteractive because it will result in increasing the volume of the collector (or the space required for the collector). Consequently, when the collector is divided into separate left and right collectors, there is a need for a method of eliminating residual resonance in regions of medium to high engine speeds without increasing the volume of the collector.

The present invention was conceived in view of this need. One object of the present invention is to provide an air intake device intended for a V-type multiple cylinder engine that have independent collectors on the left and right banks of the engine, wherein the air intake device utilizes a comparatively simple design to prevent in an effective manner a decline in the output of the engine in regions of medium to high engine speeds without causing the collector volume to increase.

In view of the foregoing, a V-type multiple-cylinder air intake device is provided that comprises a first intake collector, a second intake collector, a plurality of first branch pipes, a plurality of second branch pipes, a plurality of first intake crossover passages and a plurality of second intake crossover passages. The first intake collector is configured and arranged to receive intake air. The second intake collector is configured and arranged to receive intake air. The first branch pipes extend from the first intake collector to a respective intake port of a first bank of first cylinders. The second branch pipes extend from the second intake collector to respective intake ports of a second bank of second cylinders. The first intake crossover passages extend from the first intake collector to merge with an intermediate portion of a respective one of the second branch pipes. The second intake crossover passages extend from the second intake collector to merge with an intermediate portion of a respective one of the first branch pipes.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
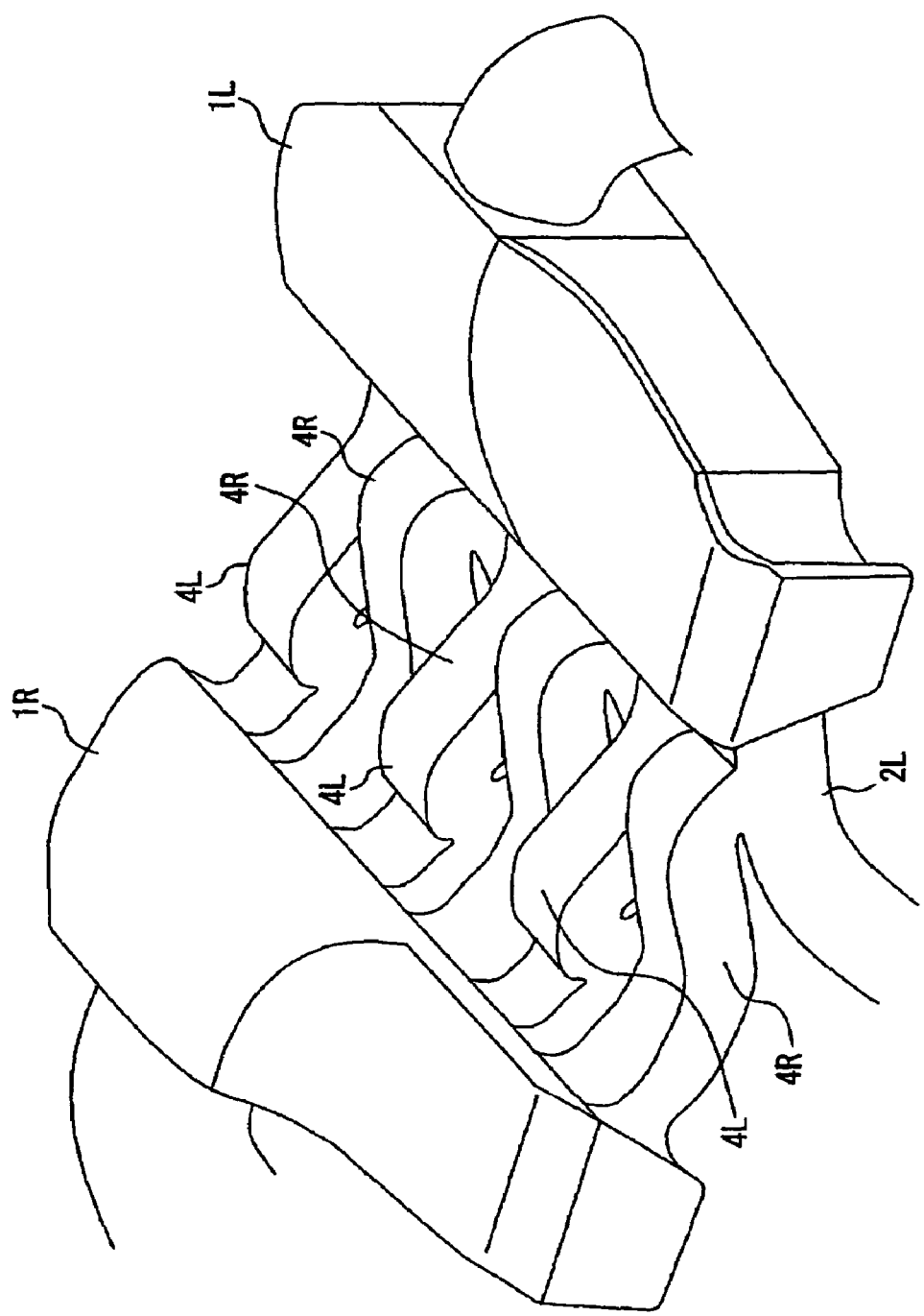
FIG. 1 is a perspective view of a V-type multiple-cylinder air intake device in accordance with a first embodiment of the present invention.
Figure 2:
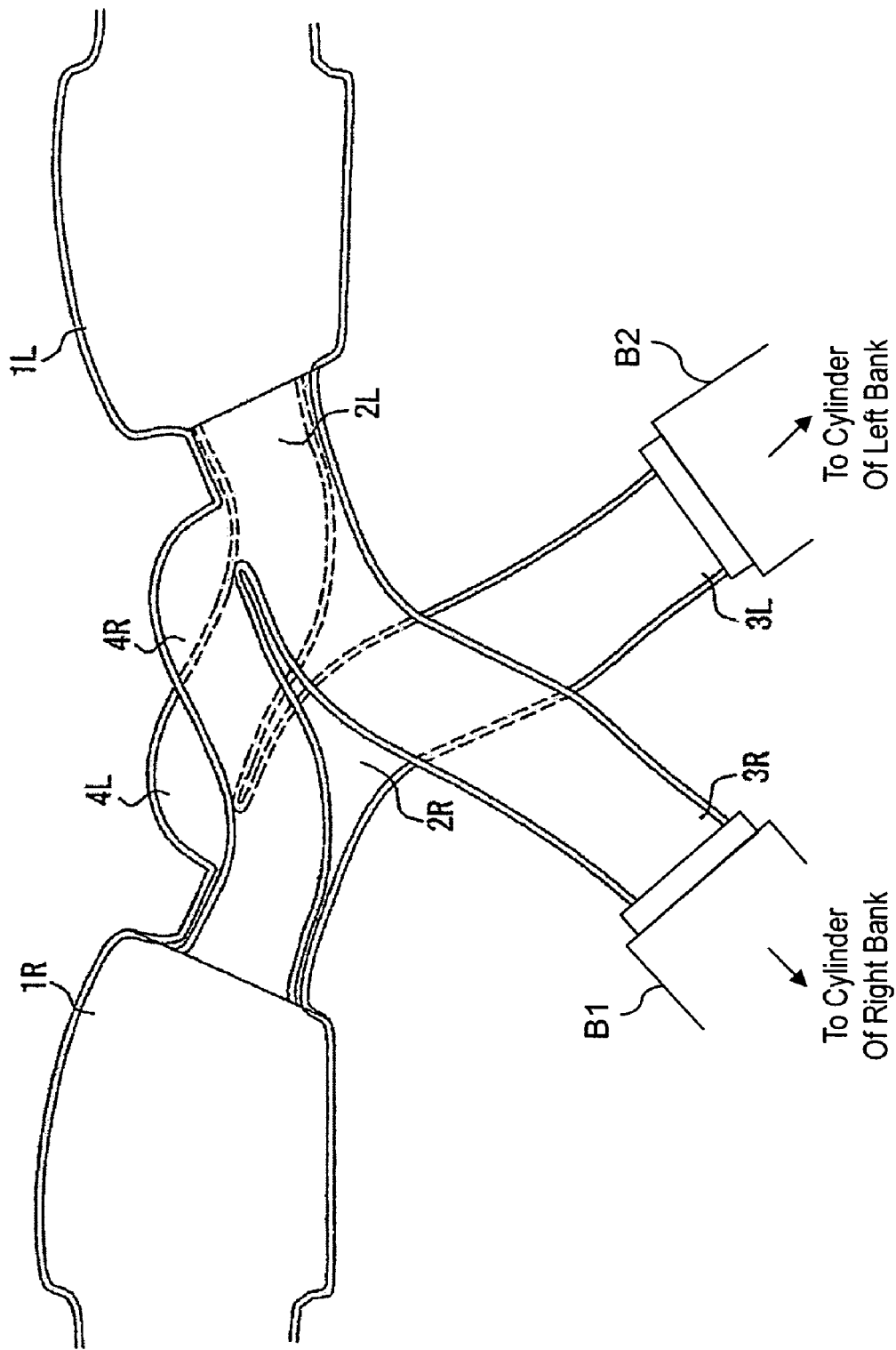
FIG. 2 is a transverse cross sectional view of the V-type multiple-cylinder air intake device seen in FIG. 1 in accordance with the first embodiment of the present invention.

Referring initially to FIGS. 1 and 2, a V-type multiple-cylinder air is illustrated in accordance with a first embodiment of the present invention. FIG. 1 is a perspective view of the air intake device configured for a V-6 engine in accordance with a first embodiment of the present invention. FIG. 2 is a transverse cross sectional view of the air intake device illustrated in FIG. 2. The V-6 engine is divided into a right bank B1 of cylinders (not shown) comprising cylinders #1, #3 and #5 and a left bank B2 of cylinders (not shown) comprising cylinders #2, #4 and #6.

As shown in FIGS. 1 and 2, the air intake device in accordance with this embodiment is an air intake manifold that basically includes a left or first collector 1L, a right or second collector 1R, a plurality of first branch pipes 2L extending from the first collector 1L to a plurality of intake ports 3R of the right bank B1 (i.e., cylinders #1, #3, #5), a plurality of second branch pipes 2R extending from the second collector 1R to a plurality of intake ports 3L of the left bank B2 (i.e., cylinders #2, #4, #6), a plurality of first intake crossover passages 4L, and a plurality of second intake crossover passages 4R.

The left or first collector 1L is arranged above the left bank B2 of left cylinders, while the right or second collector 1R arranged above the right bank B1 of right cylinders. Each of the collectors 1L and 1R is provided with an intake air introducing part (only partially shown in FIG. 1) that connected to an air intake duct for introducing intake air into the collectors 1L and 1R from the intake air introducing parts.

As best seen in FIG. 2, the first and second branch pipes 2L and 2R extend from each collector 1L and 1R, respectively and connect to the intake ports of the opposite bank. Thus, the first branch pipes 2L that extend from the left collector 1L connect to the intake ports 3R of the right bank B1 (i.e., of the #1, #3, #5 cylinders, respectively) and the second branch pipes 2R that extend from the right collector 1R connect to the intake ports 3L of the right bank B1 (i.e., of the #2, #4, #6 cylinders, respectively). As shown in FIG. 2, the first and second branch pipes 2L and 2R have an initial generally linear section connected to the collectors 1L and 1R that are formed such that their center axes are approximately linear so as to reduce the air flow resistance.

The first crossover passages 4L extend from the left collector 1L and merge with (connect to) respective ones of the second branch pipes 2R extending from the right collector 1R at comparatively upstream positions of the second branch pipes 2R. The first crossover passages 4L merge with the first branch pipes 2R from above and with comparatively large angles of incidence. Preferably, the first crossover passages 4L merge with the first branch pipes 2R at their initial generally linear sections.

Similarly, the second crossover passages 4R extend from the right collector 1R and merge with (connect to) a respective one of the first branch pipes 2L extending from the left collector 1L at comparatively upstream positions of the first branch pipes 2L. Also, the second crossover passages 4R merge with the first branch pipes 2L from above and with comparatively large angles of incidence. The present invention is not limited, however, to the merging arrangement as described and illustrated herein. Rather, it will be apparent to those skilled in the art from this disclosure that generally any arrangement is acceptable so long as the crossover passages 4R and 4L merge at an intermediate position along the first and second branch pipes 2L and 2R.

The first crossover passages 4L extending from the left collector 1L are provided in such a manner as to overlap with the upper sides of the respective second branch pipes 2R extending from the right collector 1R, and the second crossover passages 4R extending from the right collector 1R are provided in such a manner as to overlap with the upper sides of the respective first branch pipes 2L extending from the left collector 1L (see FIG. 1).

The ratio of the cross sectional area of the crossover passages 4L and 4R to the cross sectional area of the first and second branch pipes 2L and 2R (i.e., the cross sectional area ratio of the crossover passages 4L and 4R with respect to the first and second branch pipes 2L and 2R) is set in the range of approximately 0.5 to 1.0.

Experiments have demonstrated that when the first and second branch pipes 2L and 2R are used as the main intake pipes and the crossover passages 4L and 4R are used as the communication pipes connecting the left and right collectors 1L and 1R, it is necessary for the ratio of the aforementioned cross sectional area ratio to be 1.0 or less in order to reduce the tendency of the communication pipes to act as air intake pipes. It has also been demonstrated that when the output characteristic of the engine is observed while varying the cross sectional area of the crossover passages 4L and 4R, the output does not decline until the cross sectional area ratio mentioned above reaches approximately 0.5 (that is, the residual resonance can be eliminated until the cross sectional area ratio mentioned above reaches approximately 0.5). The cross sectional area ratio is set to the aforementioned range in view of these results.

The design of the air intake device having the separate left and right collectors 1L and 1R that are configured generally as described above will now be discussed in more detail. Since the inertia effect, which affects output performance, can be accommodated with the design of the first and second branch pipes 2L and 2R and since the first and second crossover passages 4L and 4R influence the resonance effect, the effects of residual resonance (i.e., decreased output) can be suppressed when the engine is operated at medium to high rotational speeds by using an air intake device configured generally as described above. However, some degree of consideration is required regarding the positions where the crossover passages 4L and 4R merge with (connect to) the first and second branch pipes 2L and 2R.

An air intake device in accordance with this embodiment has a collector (1L and 1R) arranged on each bank of a V-type multiple cylinder engine, branch pipes (2L and 2R) that extend from the collectors (1L and 1R) and connect to the intake ports (3R, 3L) of the opposite bank, and crossover passages (4L and 4R) that extend from the collectors (1L and 1R) and merge with intermediate portions of the branch pipes (2R, 2L) extending from the collector (1R, 1L) of the opposite bank. Consequently, the number of cylinders to which each collector is connected is one half of what it would be if a single collector was used and the volumetric efficiency can be improved in regions of low engine rotational speed by utilizing the resonance effect of the collectors. Additionally, since the second branches function as communication pipes and enable the intake pulsations of all cylinders act on the collectors, the influence of the resonance effect (residual resonance), which acts in a disadvantageous manner when the engine is operating in medium to high rotational speed regions, can be reduced without increasing the collector volume.

Furthermore, since the cross sectional area ratio of the crossover passages (4R, 4L) with respect to the branch pipes (2L and 2R) is set to the range from 0.5 to 1.0, the inertia effect of the intake pipes can be adjusted by appropriately designing the first branches and residual resonance, which leads to reduced engine output in medium to high rotational speed regions, can be eliminated effectively.

With the first embodiment, the output (volumetric efficiency) can be improved due to the resonance effect when the engine is operating in low rotational speed regions. Meanwhile, effect of residual resonance is suppressed and declination of engine output is prevented when the engine is operating in medium to high rotational speed regions. Moreover, the engine output (volumetric efficiency) can be improved at medium to high engine speeds by designing the branch pipes (2L and 2R) in such a manner as to take advantage of the inertia effect.

However, it is difficult to obtain a sufficient inertia effect at engine speeds ranging from the low speed region to the high speed region by merely tweaking the design of the first branches. Generally speaking, it is necessary to increase the length of the air intake pipes running from the collectors to the cylinders in order to set the optimum rotational speed for the inertia effect to a low rotational speed. Meanwhile, it is necessary to shorten the length of the air intake pipes running from the collectors to the cylinders in order to set the optimum rotational speed for the inertia effect to a high rotational speed. Therefore, it is not possible to meet the requirements of both low rotational speeds and high rotational speeds with a fixed intake pipe length. Therefore, in order to obtain a sufficient inertia effect at engine rotational speeds ranging from low speeds to high speeds, it is necessary to vary the length of the air intake pipes in accordance with the engine rotational speed.

Figure 3:
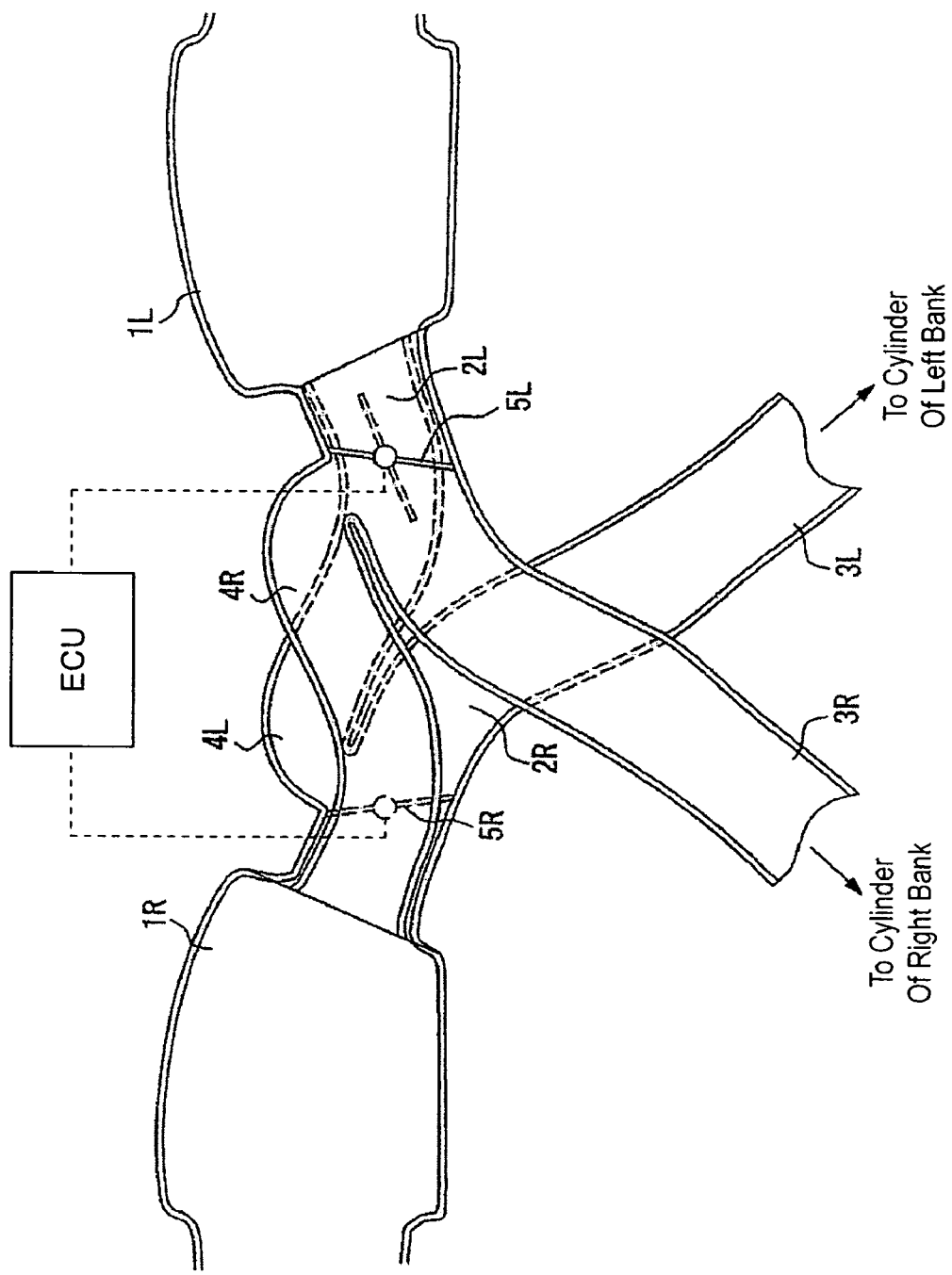
FIG. 3 is a transverse cross sectional view of a V-type multiple-cylinder air intake device in accordance with a second embodiment of the present invention.

In order to satisfy this need, a second embodiment of the present invention, as illustrated in FIG. 3 is configured such that the lengths of the air intake pipes can be changed depending on whether the engine is operating at a low rotational speed or a high rotational speed. This embodiment is only different from the first embodiment in that a plurality of ON/OFF valves 5L and 5R are provided in the portions where the first and second branch pipes 2L and 2R merge with the crossover passages 4R and 4L (i.e., inside the branch pipes 2L and 2R at positions upstream of the merge portions), and an engine control unit ECU is configured and arranged to operate the ON/OFF valves 5L and 5R in accordance with engine operating conditions from sensors such as an engine rotational speed sensor as well as other engine operating condition sensors. The ON/OFF valves 5L and 5R are configured to be driven by actuators (not shown) operated by the engine control unit ECU so as to open and close the first and second branch pipes 2L and 2R. Otherwise, the second embodiment has the same constituent features as the first embodiment. Thus, the descriptions of the parts of the second embodiment that are identical to the parts of the first embodiment may be omitted for the sake of brevity. In other words, unless otherwise specified, the rest of the configuration of the second embodiment is the same as the configuration of the first embodiment.

The actuators that open and close the ON/OFF valves 5L and 5R are controlled by a control unit (not shown) in accordance with the engine operating conditions (engine rotational speed).

When the drive signal from the engine control unit ECU closes the ON/OFF valves 5L provided in the merge portions where the first branch pipes 2L extending from the left collector 1L and the second branch pipes 4R extending from the right collector 1R merge, the first branch pipes 2L extending from the left collector 1L are blocked at the merge portion (or at a position upstream of the merge portion) and the right collector 1R is linked to the intake ports 3R of the right bank B1 through the crossover passages 4R and the first branch pipe 2L. The closed positions of ON/OFF valves 5L are indicated with solid line in FIG. 3.

Meanwhile, when the ON/OFF valves 5L are opened, as indicated with the broken line in FIG. 3, the left collector 1L is linked to the intake ports 3R of the right bank B1 and the first branch pipes 2L is linked to the crossover passage 4R. Furthermore, the ON/OFF valves 5L are configured and arranged such that when they are closed, they act as a guide for smoothly redirecting the flow of intake air from the crossover passages 4R toward the intake ports 3R of the right bank B1. More specifically, in this embodiment, the ON/OFF valves 5L are configured and arranged to close by rotating to a prescribed angle with respect to cross sectional planes that are perpendicular to the center axes of the first branch pipes 2L (e.g., approximately one half the angle at which the crossover passages 4R merge with the first branch pipes 2L).

The same valve action is achieved by the ON/OFF valves 5R that are provided in the merge portion where the second branch pipe 4R extending from the right collector 1R and crossover passage 4L extending from the left collector 1L merge. When the ON/OFF valves 5R are closed, the left collector 1L is linked to the intake ports 3L of the left bank B2 through crossover passages 4L and the second branch pipes 4R. Meanwhile, when the ON/OFF valves 5R are opened, the right collector 1R is linked to the intake ports 3L of the left bank B2 and the second branch pipes 4R and crossover passages 4L are linked together.

The ON/OFF valves 5R are configured and arranged such that when they are closed, they act as a guide for redirecting the flow of intake air from the crossover passages 4L toward the intake ports 3L of the left bank B2. More specifically, in this embodiment, the ON/OFF valves 5R are configured and arranged to close by rotating to a prescribed angle with respect to a cross sectional plane that is perpendicular to the center axes of the second branch pipes 2R (e.g., approximately one half the angle at which crossover passages 4L merge with the second branch pipes 2R).

The operation of the second embodiment will now be described.

Figure 4:
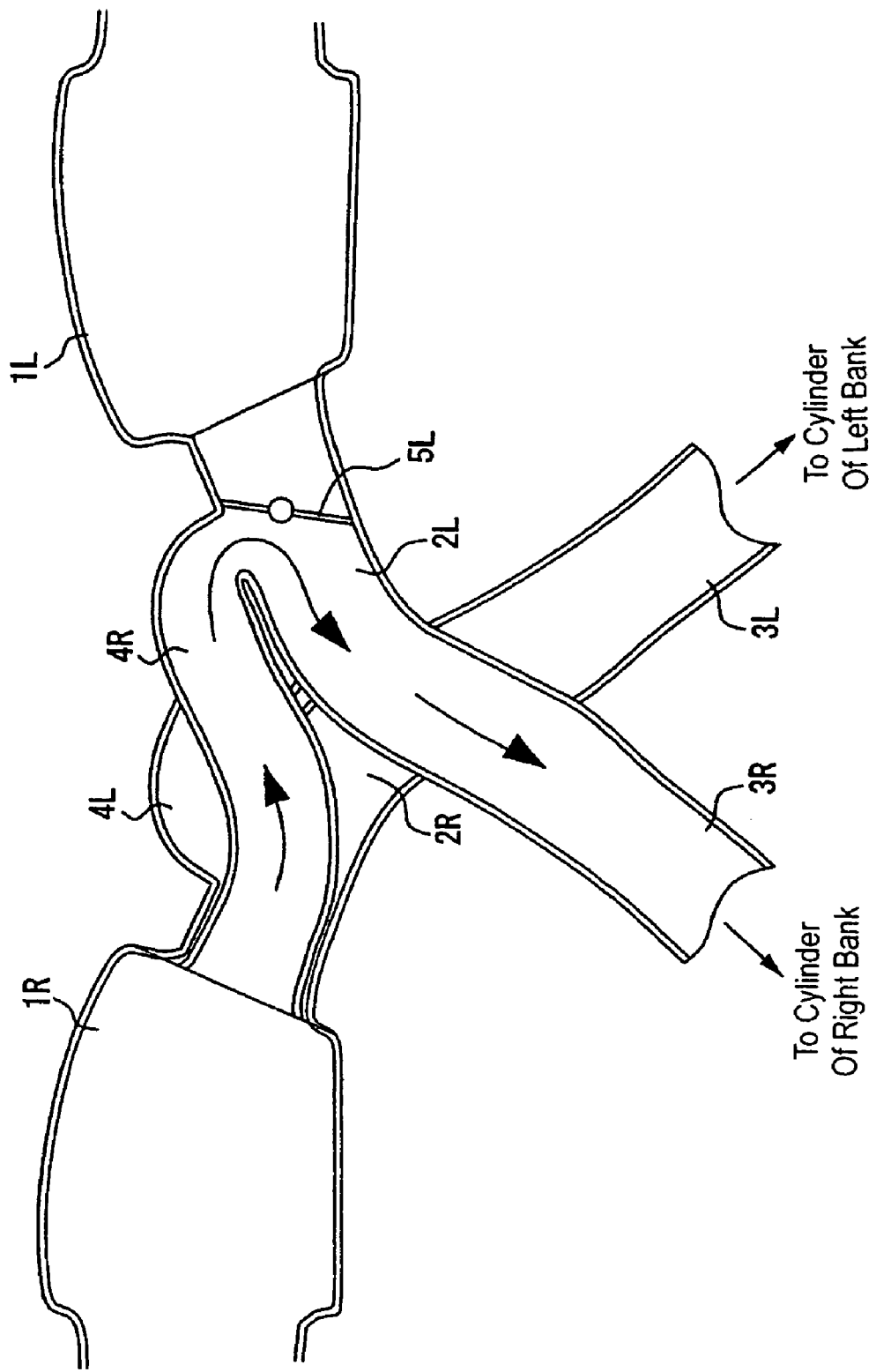
FIG. 4 is a diagram illustrating the flow of the intake air in the second embodiment when the engine is operating in a low rotational speed region.

The ON/OFF valves 5L and 5R are closed when the engine is operating in a low rotational speed region (closed positions of the ON/OFF valves 5L and 5R are indicated with solid-line sketch in FIG. 3). When the ON/OFF valves 5L are closed, the intake air flows from the right collector 1R to the intake ports 3R of the right bank B1 through the second crossover passages 4R and the first branch pipes 2L, as shown in FIG. 4. When the ON/OFF valves 5R are closed, the intake air flows from the left collector 1L to the intake ports 3L of the left bank B2 through the first crossover passages 4L and the second branch pipes 2R, as shown in FIG. 3.

By closing the valves 5L and 5R, the effective length of the intake pipes from the collectors 1L and 1R to the cylinders is lengthened and the optimum rotational speed for the inertia effect is shifted to a lower rotational speed. As a result, the volumetric efficiency can be improved using the inertia effect when the engine is operating in a low rotational speed region. Additionally, since a separate and independent collector is provided on each of the left and right banks, the volumetric efficiency can be improved by means of resonance supercharging (that is, the resonance effect can be obtained).

Figure 5:
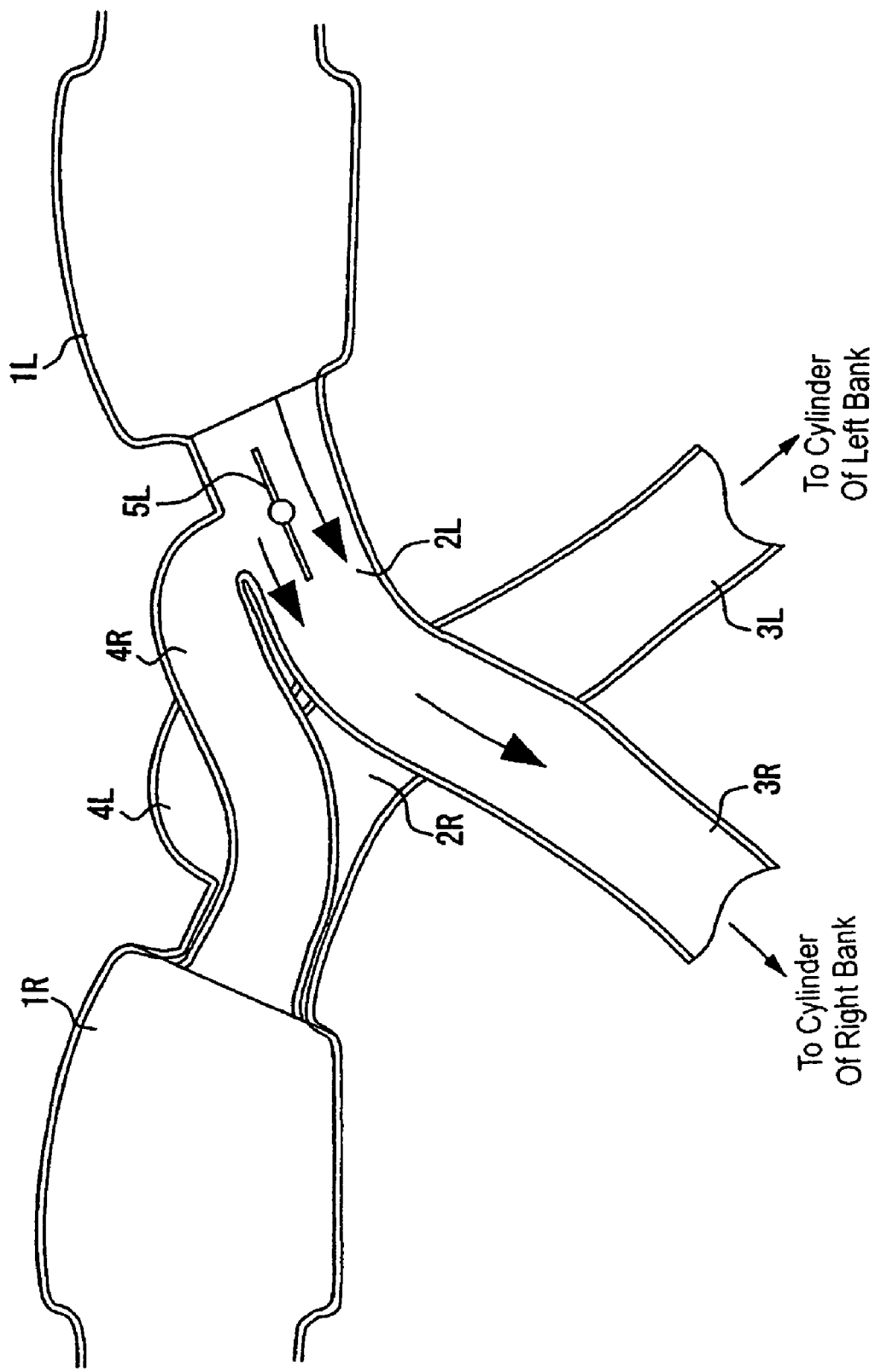
FIG. 5 is a diagram illustrating the flow of the intake air in the second embodiment when the engine is operating in a high rotational speed region.

Meanwhile, the ON/OFF valves 5L and 5R are opened when the engine is operating in a high rotational speed region (open valve position indicated with broken-line sketch in FIG. 3). When the ON/OFF valves 5L are open, the intake air from the left collector 1L flows to the intake ports 3R of the right bank B1 through the first branch pipes 2L, as shown in FIG. 5, because the air flow resistance is smaller than if the air attempted to flow through the second crossover passages 4R. Similarly, when the ON/OFF valves 5R are open, the intake air from the right collector 1R flows to the intake ports 3L of the left bank B2 through the first crossover passages 4L and the second branch pipes 2R.

By opening the ON/OFF valves 5L and 5R, the length of the intake pipes from the collectors to the cylinders is shortened and the optimum rotational speed for the volumetric efficiency is shifted to a higher rotational speed. As a result, the volumetric efficiency can be improved using the inertia effect when the engine is operating in a high rotational speed region. Additionally, since the crossover passages 4L and 4R serve as communication pipes between the left and right collectors 1L and 1R, the adverse influence of the resonance effect (residual resonance) can be eliminated when the engine is operating in a high rotational speed region.

Figure 6:
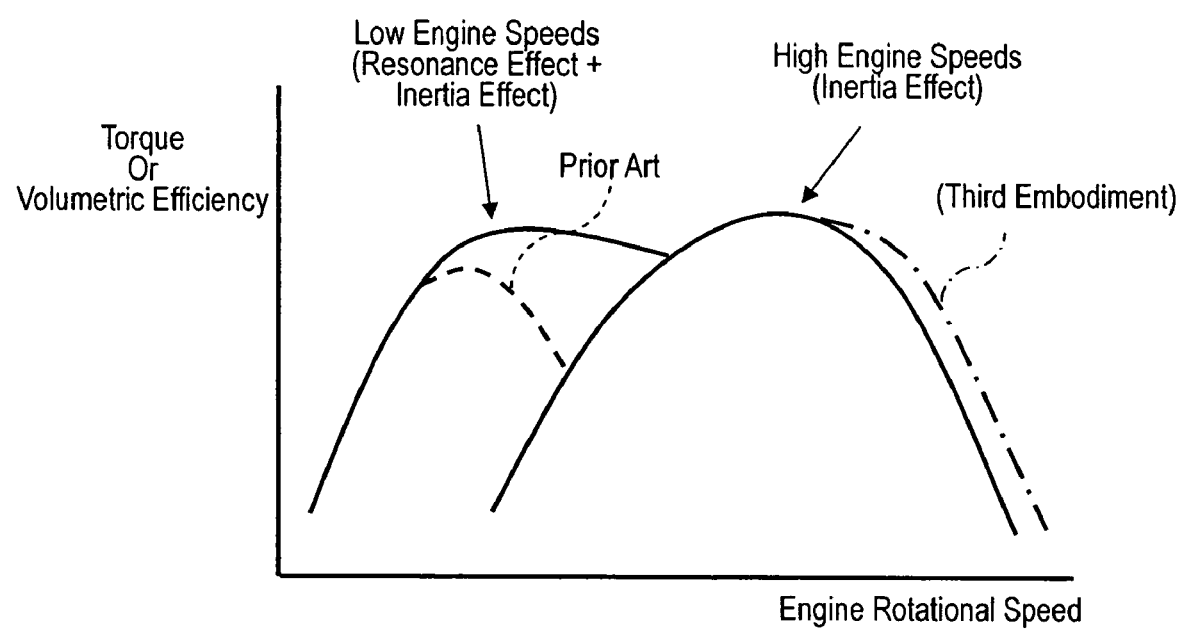
FIG. 6 is a plot illustrating the effects of the second embodiment.

Thus, as shown in FIG. 6, the utilization of both the inertia effect and the resonance effect in low rotational speed regions enables the low-speed engine output of the embodiment to be improved in an effective manner in comparison with the prior art (indicated with broken line in FIG. 6), which utilizes only the resonance effect and experiences a decline in volumetric efficiency as the rotational speed of the engine increases. Additionally, at high engine rotational speeds, the volumetric efficiency can be improved by means of the inertia effect while also eliminating the influence of the resonance effect.

The second embodiment features ON/OFF valves (5L and 5R) provided in the vicinity of the branch pipes (2L and 2R) where the crossover passages (4R, 4L) merge with the branch pipes (2L and 2R). The ON/OFF valves (5L and 5R) of the second embodiment are configured to open and close the branch pipes (2L and 2R) in accordance with the engine operating conditions. By opening and closing the branch pipes (2L and 2R) with the ON/OFF valves (5L and 5R), the connections between the collectors and the cylinders can be reversed (switched). Thus, the length of the air intake pipes from the collectors to the cylinders can be changed.

More specifically, when the ON/OFF valves (5L and 5R) are closed, the intake air flowing from each collector flows through the crossover passages (4R, 4L) and the branch pipes (2L and 2R) to the intake ports of the bank on the same side as the collector. As a result, the length of the air intake pipes from the collectors to the cylinders can be lengthened and the optimum rotational speed for the inertia effect can be shifted to a lower rotational speed, thereby improving the volumetric efficiency when the engine is operating in a low rotational speed region. Additionally, since a separate and independent collector is provided on each bank, the volumetric efficiency can be improved by means of the resonance effect.

Meanwhile, when the ON/OFF valves (5L and 5R) are opened, the intake air flowing from each collector follows the path of lower flow resistance through the branch pipes (2L and 2R) and into the intake ports of the bank on the opposite side as the collector. As a result, the length of the air intake pipes from the collectors to the cylinders can be shortened and the optimum rotational speed for the inertia effect can be shifted to a higher rotational speed, thereby improving the volumetric efficiency when the engine is operating in a high rotational speed region. Additionally, since the second branches function as communication pipes linking the collectors together, the adverse influence of the resonance effect (residual resonance) can be eliminated when the engine is operating in a high rotational speed region.

Thus, with the second embodiment, by closing the ON/OFF valves (5L and 5R) when the engine is operating in a region of low rotational speeds and opening the ON/OFF valves (5L and 5R) when the engine is operating in a region of high rotational speeds, the volumetric efficiency can be improved in an effective manner at low rotational speeds due to the action of both the resonance effect and the inertia effect and the volumetric efficiency can be improved at high rotational speeds due to the action of the inertia effect and the elimination of the adverse influence of the resonance effect.

Since the first and second branch pipes 2L and 2R are formed such that their center axes are approximately linear, the air flow resistance thereof is reduced and flow losses can be held to a minimum when the engine is operating in a region of high rotational speeds where the flow rate of the intake air is large.

A V-type engine is configured with two banks of cylinders aligned along the axial direction of the crank shaft. Since the crossover passages 4L and 4R are provided in such a manner as to overlap with the upper sides of the respective branch pipes 2R and 2L extending from the collector of the opposite branch, the excess space existing above the first and second branch pipes 2L and 2R in a V-type engine can be utilized effectively. As a result, the size of the variable intake device is prevented from becoming large and the engine as a whole can be made more compact.

The ON/OFF valves 5L and 5R are configured and arranged such that when they are closed, they act as guides for redirecting the flow of intake air from the crossover passages 4R and 4L toward the intake ports 3R of the right bank B1 and the intake ports 3L of the left bank B2, respectively. This feature allows the intake air to flow smoothly from the second branches into the first branches and prevents the air flow resistance from increasing.

Figure 7:
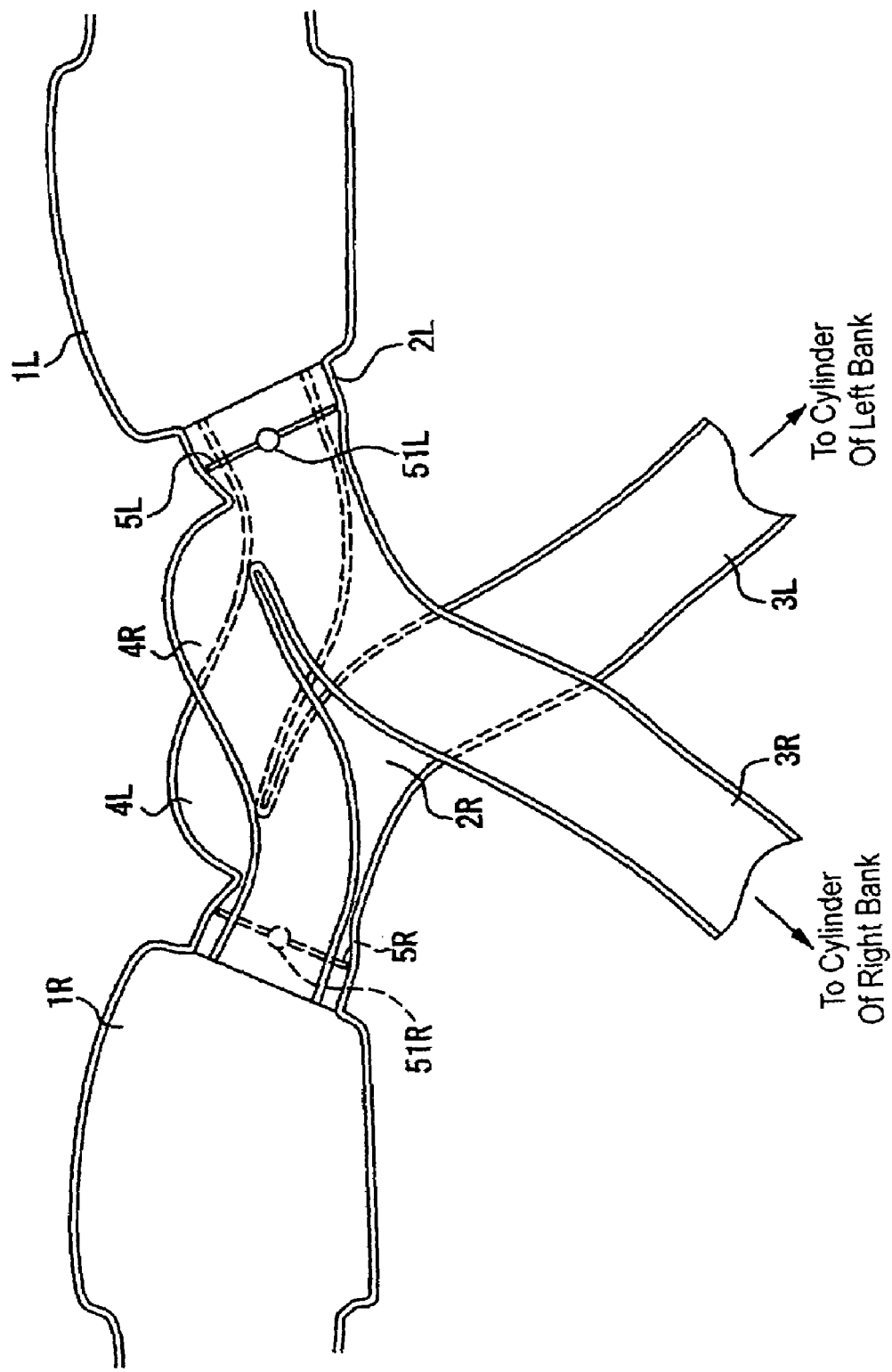
FIG. 7 is a transverse cross sectional view of a V-type multiple-cylinder air intake device in accordance with a third embodiment of the present invention.

A third embodiment of the present invention will now be described with reference to FIGS. 7 and 8. The third embodiment is different from the second embodiment in that the ON/OFF valves 5L and 5R are provided inside the first and second branch pipes 2L and 2R at positions upstream of the portions where the first and second branch pipes 2L and 2R merge with the crossover passages 4R and 4L (i.e., at positions further upstream relative to the flow of the intake air). Another difference is that the portion of each first branch pipe 2L and 2R upstream of the respective ON/OFF valve 5L and 5R (i.e., the portion of each first branch pipe 2L that is closer to the left collector 1L and the portion of each second branch pipe 4R that is closer to the right collector 1R) has a larger cross sectional area than the portion of each first branch pipe 2L and 2R downstream of the respective ON/OFF valve 5L and 5R (i.e., the portion of each first branch pipe 2L that is closer to the intake port 3R of the right bank B1 and the portion of each second branch pipe 4R that is closer to the intake port 3L of the left bank B2). Otherwise, the third embodiment has the same constituent features as the first and second embodiments. Thus, the descriptions of the parts of the third embodiment that are identical to the parts of the first and/or second embodiments may be omitted for the sake of brevity.

The shafts 51L and 51R of the ON/OFF valves 5L and 5R normally pass through the first and second branch pipes 2L and 2R and the cross sectional areas (passage cross sectional areas) of the portions of the first and second branch pipes 2L and 2R where the ON/OFF valves 5L and 5R are installed are reduced by the presence of the shafts 51L, 51R. Consequently, the air flow resistance increases and sometimes inhibits the inertia effect when the engine is operating at high rotational speeds.

With this invention, since the cross sectional area (passage cross sectional area) of the first and second branch pipes 2L and 2R is larger upstream of the position where the ON/OFF valves 5L and 5R are installed than it is downstream of the same position, a reduction in the cross sectional area of the passage (increase in the air flow resistance) can be avoided and the inertia effect can be utilized effectively in high engine speed regions to further increase the volumetric efficiency.

Figure 8:
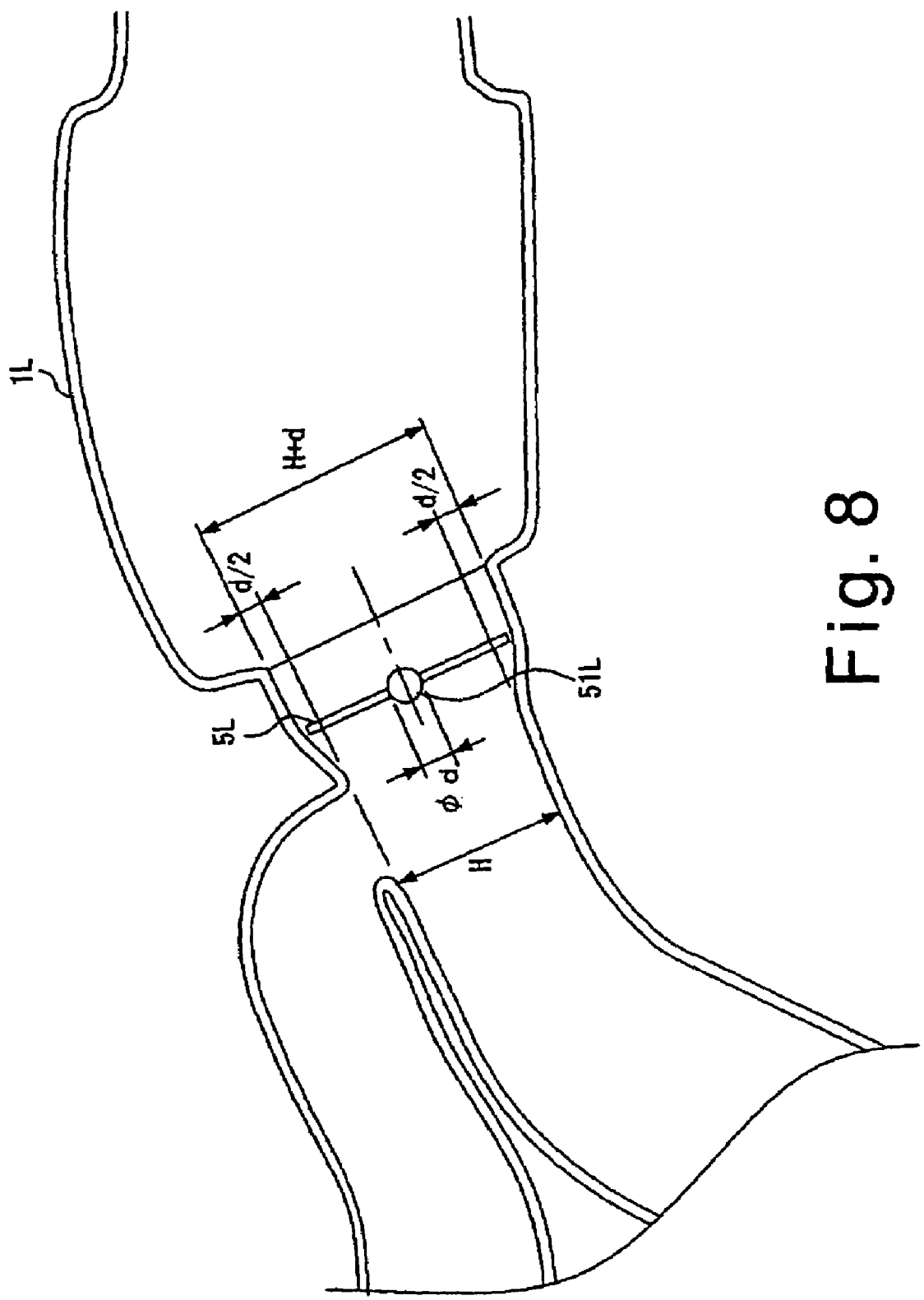
FIG. 8 is an enlarged partial transverse cross sectional view of the general vicinity of an ON/OFF valve in accordance with the third embodiment of the present invention.

FIG. 8 is an enlarged partial view of the general vicinity of an ON/OFF valve 5L. The same features illustrated in this figure regarding the vicinity of the ON/OFF valves 5L also exist in the vicinity of the ON/OFF valves 5R. If, as shown in FIG. 8, the ON/OFF valve 5L (or 5R) is a butterfly valve, the shaft 51L (or 51R) is arranged in such a position as to divide the generally vertical cross sectional dimension (direction perpendicular to flow direction) of the first branch pipe 2L (or 2R) approximately in half. Assuming the diameter of the shaft 51L (51R) is "d" and the vertical cross sectional dimension of the branch pipe 2L (or 2R) is "H" downstream of the position where the ON/OFF valve 5L (5R) is installed, the upstream portion of the section of the first branch pipe 2L (or 2R) where the ON/OFF valve 5L (or 5R) is installed (including the installation position) is designed such that the top and bottom of the cross section are both expanded by the amount d/2 to achieve a total vertical cross sectional dimension of H+d. Also, the section where the ON/OFF valve 5L (or 5R) is installed is configured such that the vertical cross sectional dimension (as well as the vertical cross sectional area) changes smoothly (i.e., decreases gradually) as one moves from the upstream side to the down stream side of the ON/OFF valve 5L (or 5R). It is also acceptable to designed the valve installation section such that the top and bottom of the cross section are both expanded by an amount larger than d/2 to achieve a total vertical cross sectional dimension that is larger than H+d.

Although not illustrated in the figures, when the ON/OFF valve 5L (or 5R) is a flap valve and the shaft 51L (or 51R) is positioned at the bottom of the branch pipe 2L (or 2R), the same effect can be achieved by designing the valve installation section such that the top of the cross section of the portion located upstream of the position where the ON/OFF valve 5L (or 5R) is installed is expanded by the amount d (or a larger amount). Similarly, if the shaft 51L (or 51R) is positioned at the top of the branch pipe 2L (or 2R), the same effect can be achieved by designing the valve installation section such that the bottom of the cross section of the portion located upstream of the position where the ON/OFF valve 5L (or 5R) is installed is expanded by the amount d (or a larger amount).

In cases where ON/OFF valves (5L and 5R) are provided in the branch pipes (2L and 2R) to change the length of the air intake pipes leading from the collectors to the cylinders, this embodiment makes it possible to prevent the ON/OFF valve itself (particularly the shaft) from reducing the cross sectional area of the branch pipe and thus increasing the air flow resistance. The embodiment accomplishes this goal by forming the sections of the branch pipes where the ON/OFF valves are installed such that the cross sectional areas of the portions located upstream of the position where the ON/OFF valves are installed are larger than the cross sectional areas of the portions located downstream of the position where the ON/OFF valves are installed. As a result, as indicated by the single-dot chain line in FIG. 6, the inertia effect can be utilized in high engine speed regions more effectively than in the second embodiment and the volumetric efficiency can be improved even further.

Additionally, by designing the valve installation section of the first branches such that the cross sectional area changes (from large to small) gradually (smoothly), the increase in air flow resistance resulting from the change in cross sectional area can be held to a minimum.

Figure 9:
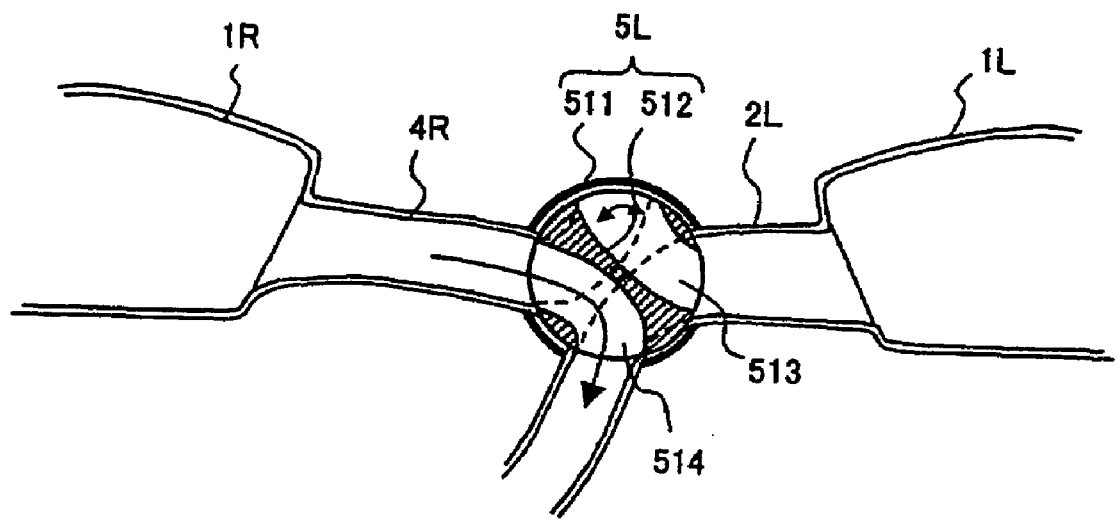
FIG. 9 is a transverse cross sectional view of a V-type multiple-cylinder air intake device with one of the ON/OFF valves shown in a first intake air flow position in accordance with a fourth embodiment of the present invention.
Figure 10:
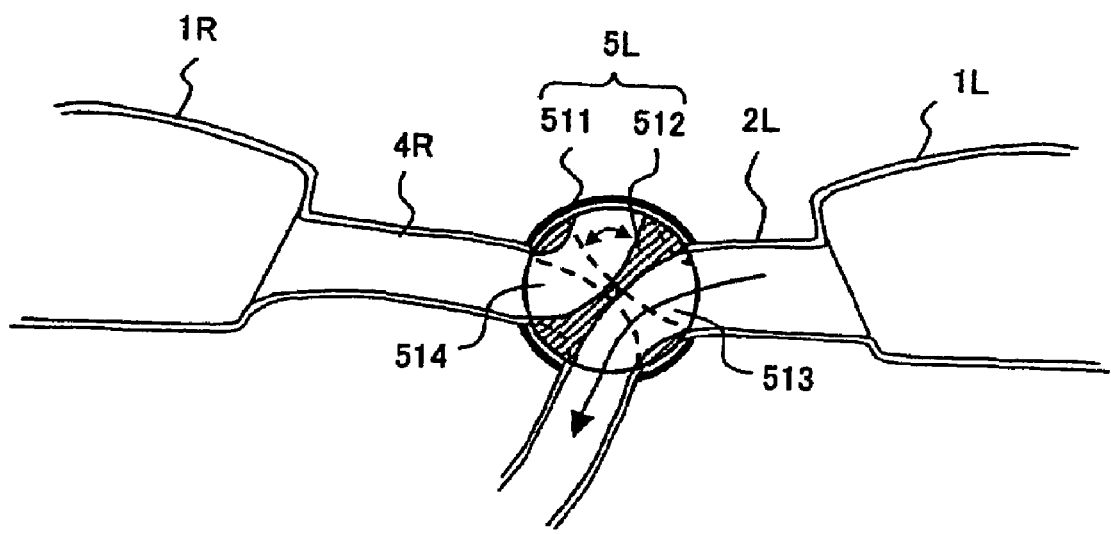
FIG. 10 is a transverse cross sectional view of the V-type multiple-cylinder air intake device illustrated in FIG. 9, but with the ON/OFF valve shown in a second intake air flow position in accordance with the fourth embodiment of the present invention.

FIGS. 9 and 10 shows a fourth embodiment of the present invention. The fourth embodiment is different from the second embodiment in that the ON/OFF valves 5L and 5R provided inside the portions where the first and second branch pipes 2L and 2R merge with the crossover passages 4R and 4L are rotary type valves. Otherwise, the fourth embodiment has the same constituent features as the second embodiment. Thus, the descriptions of the parts of the fourth embodiment that are identical to the parts of the prior embodiments may be omitted for the sake of brevity. In other words, unless otherwise specified, the rest of the configuration of the fourth embodiment is the same as the configuration of the prior embodiments.

Although FIG. 9 only illustrates the portion where a first branch pipe 2L merges with a crossover passage 4R, the portions where the second branch pipes 2R and the first crossover passages 4L merge have the same constituent features.

In addition to the increase in air flow resistance resulting from the ON/OFF valves themselves (particularly the shafts thereof), there is also an increase in air flow resistance at the portions where the first branch pipes 2L (or 2R) merge with the second crossover passages 4R (or 4L) due to the abrupt interruption of the air intake pipe. This increase in air flow resistance at the merge portions can possibly diminish the improved volumetric efficiency obtained from the valve action.

This embodiment employs rotary valves for each of the ON/OFF valves disposed in the branch pipes 2L an 2R in order to avoid such an increase in air flow resistance at the merge portions and further improve the volumetric efficiency.

More specifically, in this embodiment, each rotary valve used as an ON/OFF valve 5L (or 5R) has a first passageway that forms a portion of the first branch pipe 2L (or 2R) and a second passageway that forms a connecting pipe for smoothly connecting the crossover passage 4R and the first branch pipe 2L (or the crossover passage 4L and the second branch pipe 4R) together. The rotary valves are switched between the first passageway positions and the second passageway positions depending on the rotational speed of the engine.

As shown in FIGS. 9 and 10, the ON/OFF valve 5L (or 5R) includes a cylindrical casing 511 and a rotor 512 supported in a freely rotatable manner in the casing 512. Both faces of the rotor 512 are formed to match the contour of the intake pipe and, depending on the rotational position of the rotor 512, the ON/OFF valve 5L (or 5R) functions either as a portion (first passageway) 513 of the first branch pipe 2L (or 2R) or as a connecting pipe (second passageway) 514 connecting the crossover passage 4R and the first branch pipe 2L (or crossover passage 4L and the second branch pipe 2R) smoothly together.

The actuator (not shown) is, for example, a diaphragm actuator that operates using intake air pressure. The actuator serves to drive the rotor 512 in a rotary manner so as to set the ON/OFF valve 5L (or 5R) to function either as a portion of the first branch pipe 2L (or 2R) or as the aforementioned connecting pipe, thereby switching which collector communicates with which cylinders and changing the length of the air intake pipes leading from the collectors to the cylinders.

FIG. 9 shows the state of an ON/OFF valve 5L (or 5R) when it is set to function as the second passageway 514, i.e., as a connecting pipe connecting the crossover passage 4R and the first branch pipe 2L (or crossover passage 4L and the second branch pipe 2R) together. This state is selected chiefly when the engine is operating in a low rotational speed region. When this state is selected, the intake air from the right collector 1R passes through the second crossover passages 4R and the ON/OFF valves 5L (which act as connecting pipes) and flows into the intake ports 3R of the right bank B1 and the intake air from the left collector 1L passes through the first crossover passages 4L and the ON/OFF valves 5R (which act as connecting pipes) and flows into the intake ports 3L of the left bank B2. In other words, the intake gas from each collector flows into the intake ports of the bank on the same side as the collector.

Thus, the length of the air intake pipes from the collectors to the cylinders is lengthened and the air flow resistance at the portions where the first branches and second branches merge is prevented from increasing because the ON/OFF valves function as connecting pipes connecting the second branches to the first branches. As a result, the volumetric efficiency is improved even further in low engine speed regions.

FIG. 10 shows the state of an ON/OFF valve 5L (5R) when it is set to function as the first passageway 513, i.e., a portion of the first branch pipe 2L (or the second branch pipe 2R). This state is selected chiefly when the engine is operating in a high rotational speed region. When this state is selected, the intake air from the left collector 1L passes through the first branch pipes 2L and the ON/OFF valves 5L (each of which forms a portion of the respective first branch) and flows into the intake ports 3R of the right bank B1 and the intake air from the right collector 1R passes through the second branch pipes 2R and the ON/OFF valves 5R (each of which forms a portion of the respective first branch) and flows into the intake port 3L of the left bank B2. In other words, the intake gas from each collector flows into the intake ports of the bank on the opposite side as the collector.

Thus, the length of the air intake pipes from the collectors to the cylinders is shortened and the air flow resistance at the portions where the first branches and second branches merge is prevented from increasing because the ON/OFF valves function as portions of the first branches. As a result, the volumetric efficiency is improved in high engine speed regions.

In this embodiment, each of the ON/OFF valves (5L and 5R) is a rotary valve configured to have a first passageway (513) that forms a portion of the first branch pipe (2L and 2R) and a second passageway (514) that forms a connecting pipe for connecting the crossover passages (4R, 4L) to the first branch pipes (2L and 2R). By setting the rotary valves to the first passageway (513) or the second passageway (514) depending on the engine operating conditions, the length of the air intake pipes can be changed in accordance with the engine operating conditions. Additionally, the air flow resistance associated with passing through the ON/OFF valves can be reduced with respect to both valve positions (first passageway position and second passageway position). As a result, the volumetric efficiency can be improved in an effective manner for engine speed regions ranging from low to high speeds.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-411318. The entire disclosure of Japanese Patent Application No. 2003-411318 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A V-type multiple-cylinder air intake device comprising:
   a first intake collector configured and arranged to receive intake air;
   a second intake collector configured and arranged to receive intake air;
   a plurality of first branch pipes extending from the first intake collector to a respective intake ports of a first bank of first cylinders, the first bank being disposed closer to the second intake collector than to the first intake collector;
   a plurality of second branch pipes extending from the second intake collector to respective intake ports of a second bank of second cylinders, the second bank being disposed closer to the first intake collector than to the second intake collector;
   a plurality of first intake crossover passages extending from the first intake collector to merge with an upstream portion of a respective one of the second branch pipes; and
   a plurality of second intake crossover passages extending from the second intake collector to merge with an upstream portion of a respective one of the first branch pipes,
   the first and second branch pipes being configured as separate, non-fluidly communicating passages such that the intake air flowing through the first branch pipes does not mix with the intake air flowing through the second branch pipes.

2. The V-type multiple-cylinder air intake device recited in claim 1, wherein
the first and second intake crossover passages have cross sectional areas with respect to cross sectional areas of the first and second branch pipes in a range of approximately 0.5 to 1.0.

3. The V-type multiple-cylinder air intake device recited in claim 1, wherein
each of the first and second branch pipes includes an ON/OFF valve disposed in a vicinity of the intermediate portions of the first and second branch pipes to open and close the first and second branch pipes.

4. The V-type multiple-cylinder air intake device recited in claim 1, wherein
the first and second branch pipes include generally linear sections exiting the first and second intake collectors.

5. The V-type multiple-cylinder air intake device recited in claim 4, wherein
the first and second intake crossover passages are connected at the generally linear sections.

6. The V-type multiple-cylinder air intake device recited in claim 1, wherein
the first and second intake crossover passages are configured to overlap with upper facing sides of the first and second branch pipes.

7. A V-type multiple-cylinder air intake device comprising:
a first intake collector configured and arranged to receive intake air;
a second intake collector configured and arranged to receive intake air;
a plurality of first branch pipes extending from the first intake collector to a respective intake port of a first bank of first cylinders;
a plurality of second branch pipes extending from the second intake collector to respective intake ports of a second bank of second cylinders;
a plurality of first intake crossover passages extending from the first intake collector to merge with an intermediate portion of a respective one of the second branch pipes; and
a plurality of second intake crossover passages extending from the second intake collector to merge with an intermediate portion of a respective one of the first branch pipes,
the first and second branch pipes being configured as separate, non-fluidly communicating passages such that the intake air flowing through the first branch pipes does not mix with the intake air flowing through the second branch pipes,
each of the first and second branch pipes including an ON/OFF valve disposed in a vicinity of the intermediate portions of the first and second branch pipes to open and close the first and second branch pipes, the ON/OFF valves being configured to form a guide part when closed for redirecting intake air from the first and second intake crossover passages toward the intake ports.

8. The V-type multiple-cylinder air intake device recited in claim 3, wherein
the ON/OFF valves are installed inside the first and second branch pipes at positions upstream of portions where the first and second branch pipes and the flint and second intake crossover passages merge.

9. The V-type multiple-cylinder air intake device recited in claim 8, wherein
each of the first and second branch pipes has a cross sectional area that is larger in a portion upstream of the ON/OFF valve than a portion downstream of the ON/OFF valve.

10. A V-type multiple-cylinder air intake device comprising:
a first intake collector configured and arranged to receive intake air;
a second intake collector configured and arranged to receive intake air;
a plurality of first branch pipes extending from the first intake collector to a respective intake port of a first bank of first cylinders;
a plurality of second branch pipes extending from the second intake collector to respective intake ports of a second bank of second cylinders;
a plurality of first intake crossover passages extending from the first intake collector to merge with an intermediate portion of a respective one of the second branch pipes; and
a plurality of second intake crossover passages extending from the second intake collector to merge with an intermediate portion of a respective one of the first branch pipes,
the first and second branch pipes being configured as separate, non-fluidly communicating passages such that the intake air flowing through the first branch pipes does not mix with the intake air flowing through the second branch pipes,
each of the first and second branch pipes including an ON/OFF valve disposed in a vicinity of the intermediate portions of the first and second branch pipes to open and close the first and second branch pipes, each of the ON/OFF valves having a first passageway and a second passageway with the first passageway being configured to form a portion of a respective one of the first and second branch pipes and the second passageway being configured to form a connecting pipe for connecting a respective one of the first and second intake crossover passages and the respective one of the first and second branch pipes together.

11. The V-type multiple-cylinder air intake device recited in claim 3, further comprising
a control unit configured to operate the ON/OFF valves in accordance with an engine operating condition.

12. The V-type multiple-cylinder air intake device recited in claim 1, wherein
the first and second intake crossover passages have cross sectional areas with respect to cross sectional areas of the first and second branch pipes in a range of approximately 0.5 to 1.0.

13. The V-type multiple-cylinder air intake device recited in claim 12, wherein
the ON/OFF valves are installed inside the first and second branch pipes at positions upstream of portions where the first and second branch pipes and the first and second intake crossover passages merge.

14. The V-type multiple-cylinder air intake device recited in claim 13, wherein
the first and second branch pipes include generally linear sections exiting the first and second intake collectors.

15. The V-type multiple-cylinder air intake device recited in claim 14, wherein
the first and second intake crossover passages are connected at the generally linear sections.

16. The V-type multiple-cylinder air intake device recited in claim 15, wherein
each of the first and second branch pipes has a cross sectional area that is larger in a portion upstream of the ON/OFF valve than a portion downstream of the ON/OFF valve.

17. A V-type multiple-cylinder air intake device comprising:
first intake collecting means for receiving intake air;
second intake collecting means for receiving intake air;
first intake air introducing means for conveying intake air from the first intake collecting means to a respective intake port of a first bank of first cylinders, the first bank being disposed closer to the second intake collecting means than to the first intake collecting means;
second intake air introducing means for conveying intake air from the second intake collecting means to respective intake ports of a second bank of the second cylinders, the second bank being disposed closer to the first intake collecting means than to the second intake collecting means;
first intake air crossover means for connecting the first intake collecting means to the second intake air introducing means at a point upstream of the second intake air introducing means; and
second intake air crossover means for connecting the second intake collecting means to the first intake air introducing means at a point upstream of the first intake air introducing means,
the first and second intake air introducing means being configured as separate, non-fluidly communicating passages such that the intake air flowing through the first intake air introducing means does not mix with the intake air flowing through the second intake air introducing means.

* * * * *